United States Patent Office 3,414,630
Patented Dec. 3, 1968

3,414,630
METHOD FOR SEPARATING META-PARA XYLENE MIXTURES
Theodore H. Szawlowski, Lake Park, Fla., and Charanjit Rai, Somerset, N.J., assignors to Union Oil Company of California, Los Angeles, Calif., a corporation of California
No Drawing. Continuation-in-part of applications Ser. No. 562,960, Ser. No. 562,961, and Ser. No. 562,962, June 30, 1966; and Ser. No. 625,274, Dec. 27, 1966. This application Feb. 27, 1967, Ser. No. 618,990
52 Claims. (Cl. 260—674)

ABSTRACT OF THE DISCLOSURE

The fractional crystallization of p-xylene from meta-para xylene mixtures is carried out at below the normal meta-para binary eutectic freezing point of the feed mixture. Crystallization of the meta-para eutectic is inhibited by adding to the feed mixture a small proportion, not more than about 3 mole-percent, of a sufficiently soluble organic compound containing at least one of the hetero-atoms, oxygen, sulfur, nitrogen, phosphorus, silicon, boron and halogen.

RELATED APPLICATIONS

This application is a continuation-in-part of each of the following applications, all of which are now abandoned:

Ser. No. 625,274, filed Dec. 27, 1966, which in turn is a continuation of Ser. No. 267,822, filed Mar. 25, 1963, now abandoned.

Ser. No. 562,961, filed June 30, 1966, which in turn is a continuation of Ser. No. 267,821, filed Mar. 25, 1963, now abandoned.

Ser. No. 562,962, filed June 30, 1966, which in turn is a continuation of Ser. No. 267,823, filed Mar. 25, 1963, now abandoned.

Ser. No. 562,960, filed June 30, 1966, which in turn is a continuation of Ser. No. 267,820, filed Mar. 25, 1963, now abandoned.

SUMMARY OF INVENTION

This invention relates to the separation of xylene isomers, and more particularly to the separation of p-xylene from mixtures of xylene isomers by fractional crystallization. Briefly, the invention comprises adding a small proportion, not more than about 3 mole-percent, of a eutectic inhibitor to the xylene mixture, and then cooling the mixture to temperatures below the normal meta-para eutectic crystallization temperature of the particular xylene mixture concerned, whereby increased yields of crystalline p-xylene are obtained, leaving a mother liquor having a p-xylene/m-xylene ratio substantially below the normal 13/87 eutectic ratio. The eutectic inhibitors employed may comprise any organic compound containing one or more hetero-atoms of oxygen, sulfur, nitrogen, phosphorus, silicon, boron or halogen, and which is soluble to the extent of at least about 0.01 mole-percent in the xylene feed at room temperatures. The presence of these inhibitors in very small amounts has been found to promote the formation of supercooled mixtures from which p-xylene can be readily crystallized, leaving a metastable mother liquor containing less than the normal eutectic proportion by p-xylene. This mother liquor remains in a metastable condition for several hours even while being agitated, thus rendering the crystallization of p-xylene feasible in commercial scraped-surface chilling units.

Operative amounts of the inhibitor may range from as little as 0.001 mole-percent, based on total xylene content of the feed, up to about 3 mole-percent. Preferred proportions generally range between about 0.01 and 2 mole-percent. Optimum amounts will vary, depending upon the specific inhibitor. In general, the more highly polar compounds can be used in smaller amounts, while larger proportions of the less polar compounds are usually desirable.

Preferably, the inhibitor is a water-soluble compound which can readily be separated from the mother liquor and the p-xylene product by simple water washing. The washed mother liquor can then be chilled to crystallize m-xylene and thus re-establish a mother liquor containing m-xylene and p-xylene in eutectic proportions. Additional p-xylene can then be recovered from this eutectic mother liquor by adding one of the eutectic-inhibiting additives and supercooling to below the eutectic freezing point of about —64° F. Thus a complete cyclic process is provided for the resolution of mixtures of meta and para xylene. If ortho xylene is present in the feed, it is preferably removed by distillation prior to the crystallization of p-xylene.

DETAILED DESCRIPTION

Xylene isomers have boiling points so close together that it is not feasible to separate the isomers, especially the meta- and para-xylene isomers, by distillation. While ortho-xylene may be separated from other xylenes by precision fractionation procedures, the boiling points of the meta- and para-isomers are so close that satisfactory separation of these isomers by distillation is not practical.

Attempts have been made to separate meta- and para-xylenes by employing chemical methods in which the isomers are reacted with suitable reagents to form compounds which may be readily separated by physical means. The compounds, after separation, are then separately converted back to the respective xylenes. In most instances, such chemical methods of separation are expensive because of the number of procedural steps required, the consumption of reagents, and the formation of by-products which may be of little value.

Fractional crystallization of xylene isomers has been extensively utilized, but the separation possible in the crystallization process is limited by the composition of a eutectic mixture of the isomers that is formed. Meta- and para-xylene form a eutectic composition containing approximately 87% meta-xylene and 13% para-xylene. Since xylenes are most frequently obtained in substantially equilibrium ratios in which the meta-xylene is present in higher concentration than the other isomer, the amount of para-xylene recovered by a conventional crystallization process is relatively low. If one of the components of the eutectic-forming mixture is present in excess of the concentration defined by the eutectic composition, that component is the saturating component and the other is the saturated component. When a eutectic-forming liquid mixture in which one of the components is present in excess of that defined by the eutectic composition is cooled, the mixture becomes saturated with the saturating component, and the amount of the saturating component in excess of that defined by the eutectic composition can be crystallized and removed to leave a mixture having the eutectic compositon. No further separation of the mixture is possible by ordinary crystallization methods.

U.S. Patent No. 2,884,470 discloses that meta-para xylene mixtures can be supercooled without an additive to crystallize p-xylene at temperatures below the freezing point of the metal-para eutectic. However, this supercooling without an additive produces a very sensitive metastable system which is easily and unpredictably destabilized by agitation or the presence of foreign crystallization nuclei. As a consequence, such systems may freeze up completely at unpredictable times and in an uncontrollable manner. The eutectic inhibitors of the present invention are found to increase materially the stability of such metastable systems in respect to crystallization of the meta-para eutectic, but do not appear to inhibit the crystallization of p-xylene.

The prior art also discloses processes for separating xylene mixtures by the addition of a third component to the binary eutectic mixture to produce a ternary mixture in which one of the two components is present in excess of the ternary eutectic composition. Thus, a ternary mixture of carbon tetrachloride, meta-xylene and para-xylene has been employed to break the meta-xylene, para-xylene eutectic. Such methods have not proved to be altogether satisfactory since the amount of carbon tetrachloride employed is about equal to the amount of the eutectic treated, and therefore the cooling load for the process is doubled.

Attempts have also been made to increase the recovery of para-xylene from a mixture of meta- and para-xylenes by the addition of a hydrocarbon diluent to the mixture prior to the fractional crystallization. The diluent has the effect of lowering the freezing point of one of the isomers more than the other. Thus, on cooling the liquid phase to sufficiently low temperatures to cause crystallization, one of the isomers, usually the para-isomer, may be separated in sufficiently large amounts to leave a liquid having a para-isomer concentration, on a diluent-free basis, lower than the concentration in a normal eutectic mixture of the meta- and para-isomers. The isomer crystals are separated from the remaining liquid phase and the diluent stripped therefrom. A subsequent crystallization process, preferably of a substantially equilibrium type, will form crystals of the meta-isomer and leave a relatively small amount of a normal meta-para eutectic mixture, which may be recycled to the charge stock. It is apparent that the addition of a diluent complicates the separation of isomers by adding a step of stripping a large volume of diluent from the isomers, as well as increasing the cooling load of the process very substantially.

It is therefore, the principal object of this invention to increase the stability of supercooled meta-para xylene mixtures to permit additional recovery of p-xylene, without adding substantially to the cooling and distillation loads, and without decreasing throughput capacity of the freezing plant.

The process of this invention is applicable to any hydrocarbon mixture containing meta and para xylenes wherein the normal recovery of p-xylene by crystallization is limited by the formation of the meta-para eutectic. Normally, but not necessarily, the feed will consist essentially of meta- and para-xylene since the other isomers, ethylbenzene and o-xylene, can be separated by fractional distillation. The operative utility of the present invention is most apparent in the recovery of p-xylene from mixtures having the 13/87 eutectic composition.

In referring to mixtures having eutectic composition it is to be understood that mixtures of near-eutectic compositions are included. As a practical matter, it is hardly likely that a mixture of exact eutectic composition would ever be obtained in a large scale crystallization operation. However, for purposes of this disclosure, when the maximum practical amount of the saturating component has been crystallized without danger of crystallization of any eutectic mixture, the remaining mixture is referred to as having a eutectic composition.

The temperature at which a solid phase having the eutectic composition crystallizes is a definite and fixed temperature at a given pressure, and this temperature is called the eutectic temperature. In the case of pure meta-para xylene mixtures, this eutectic temperature is about −64° F., but where other low-melting diluents are present, e.g. ethylbenzene or paraffins, the eutectic temperature will be correspondingly lower.

Where the feed contains para-xylene in excess of the para-xylene, meta-xylene eutectic ratio, the method of this invention may be carried out either by initially adding a small amount of the eutectic inhibitor to the feed and separating para-xylene by crystallization, or by subjecting the feed to a preliminary crystallization step before incorporating the inhibitor therein. Thus, the feed may be cooled to a temperature not lower than about −64° F. to separate crystals of para-xylene from the liquid phase, which is then substantially a eutectic mixture of para- and meta-xylene, the crystallized para-xylene separated from the liquid phase and the additive incorporated in the liquid phase. The eutectic liquid phase is then cooled to a temperature in the range of about −80° to −105° F. to crystallize additional quantities of para-xylene from the liquid phase, which then may be substantially pure meta-xylene.

In some cases, it has been found that the eutectic inhibitor appears to have some tendency to also inhibit the crystallization of p-xylene from the supercooled mixture. This tendency can be overcome by insuring that traces of water, e.g. 0.1–100 parts per million, are present in the mixture prior to cooling. But it is rarely necessary to add water to the mixture before cooling, since commercially xylene, and also the additives in technically pure grade, generally contain sufficient water to provide the trace amounts required. However, very small amounts of water may be added if desired.

Additives which have been found to be useful as eutectic inhibitors in the present invention encompass a very broad range of organic compounds. The basic operative requirements appear to be merely (1) the presence in the molecule of a functional group comprising one or more of the hetero-atoms, oxygen, sulfur, nitrogen, phosphorus, silicon, boron and halogen, and (2) sufficient solubility in xylene mixture to remain dissolved in operative concentrations at the low temperatures involved. As a practical matter, stable compounds having about 1–25 carbon atoms, and substantial water solubility, are preferred. Compounds having a dipole moment of at least about 1.0 D are normally preferred.

Operative compounds include, but are not limited to, alcohols, phenols, quinones, ketones, aldehydes, ethers, epoxides, mercaptans, thio-ethers, sulfides, carboxylic acids and the esters, salts and amides thereof, amines, amine oxides, imines, nitro compounds, nitrates, nitrites, nitriles, halohydrocarbons, sulfonic acids and the esters, salts and amides thereof, sulfones, sulfoxides, sulfates, acyl halides, phosphates, phosphines, phosphites, azo compounds, heterocyclic oxygen, nitrogen and sulfur compounds, organic silicates, silanes, silanols, silanedioles, siloxanes, borates, borines and compounds containing any desired combination of such functional groups. Preferred classes of compounds include the following:

A. Saturated aliphatic ketones having 1 to 20 carbon atoms, including specifically:

Acetone
Methyl ethyl ketone
Methyl isobutyl ketone
Di-isobutyl ketone
Di-ethyl ketone
Methyl propyl ketone
Methyl hexyl ketone
Methyl octyl ketone
Methyl dodecyl ketone
Di-octyl ketone
Di-hexyl ketone
Octyl dodecyl ketone Especially preferred are acetone and methyl isobutyl ketone.

B. $C_1$ to $C_4$ dialkoxy gem-substituted aliphatic hydrocarbons of 1 to 8 carbon atoms, and $C_2$ to $C_8$ alkylenedioxy gem-substituted aliphatic hydrocarbons of 1 to 8 carbon atoms, including specifically:

Dimethoxy methane (methylal)
Diethoxy methane (ethylal)
1,1-diethoxy ethane (acetal)
2,2-diethoxy propane
1,1-diethoxy butane
1,1-diethoxy heptane
2,2-diethoxy butane
1,1-diethoxy octane
1,1-dibutoxy ethane
2,2-dibutoxy propane
1,1-dimethoxy cyclohexane Examples of suitable alkylenedioxy compounds are:

Ethylenedioxy methane
1,1-ethylenedioxy ethane
1,1-ethylenedioxy propane
2,2-ethylenedioxy propane
1,1-ethylenedioxy heptane
2,2-ethylenedioxy pentane
1,1-ethylenedioxy cyclohexane
2,2-ethylenedioxy heptane
1,1-(1–3 propylenedioxy) ethane
1,1-(1–2 propylenedioxy) ethane
2,2-(1–2 butylenedioxy) propane
2,2-(1–2 octylenedioxy) propane
1,1-(1–3 hexylenedioxy) ethane Especially preferred are dimethoxy methane, 1,1-diethoxy ethane, and 1,1-ethylenedioxy ethane.

C. Lower alkanols of 1–12 carbon atoms, including specifically:

Methanol
Ethanol
n-Propanol
Isopropanol
n-Butanol
sec. Butanol
Isobutanol
2-ethylhexane-1-ol D. Aldehydes of 1–12 carbon atoms, including specifically:

Formaldehyde
Acetaldehyde
Propionaldehyde
n-Butyraldehyde
Isobutyraldehyde
n-Nonaldehyde
Benzaldehyde E. Chlorohydrocarbons of 1–12 carbon atoms, including specifically:

Carbon tetrachloride
Chloroform
Methylene chloride
Ethylene dichloride
p-Dichlorobenzene F. Cyclic ethers of 3–12 carbon atoms, including specifically:

1,4-dioxane
1,3-dioxane
Furan
Tetrahydrofuran

G. Morpholine and alkyl morpholines of the formula:

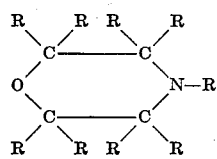

wherein each R is hydrogen or an alkyl radical having 1 to 3 carbon atoms, including specifically:

Morpholine
N-methyl morpholine
N-isopropyl morpholine
2-methyl morpholine
3,5-dimethyl morpholine
3,5-dipropyl morpholine
3-methyl N-methyl morpholine
3,5-dimethyl N-isopropyl morpholine
3,3,5,5-tetramethyl morpholine H. Aliphatic carboxylic acids of 1–20 carbon atoms and aliphatic esters, alkali metal salts, alkyl-substituted and unsubstituted ammonium salts, and alkyl substituted and unsubstituted amides thereof, including specifically:

(1) Aliphatic acids of 2–20 carbon atoms, e.g.:

Acetic acid
Butyric acid
Lauric acid
Palmitic acid
Stearic acid
Oleic acid
Ricinoleic acid
Linoleic acid
Linolenic acid
Coconut oil, palm oil, olive oil, castor oil, peanut oil, lard, tallow, etc., fatty acids.

(2) Esters of the formula XOR, wherein X represents a $C_2$ to $C_9$ aliphatic acyl group and R represents a straight chain or branched chain aliphatic radical of 1 to 20, preferably 1 to 12, carbon atoms, e.g.:

Butyl acetate
Amyl Formate
n-Hexyl n-propionate
Methyl n-butyrate
Ethyl laurate
Isopropyl n-pentanoate (3) Alkali metal salts of any of the foregoing carboxylic acids, including specifically:

Sodium stearate
Potassium oleate
Lithium acetate
Lithium stearate
Sodium acetate
Sodium butyrate
Sodium laurate
Sodium palmitate
Sodium linoleate
Potassium linoleate
Alkali metal salts of coconut oil, palm oil, olive oil, etc., fatty acids (4) Ammonium salts of the formula:

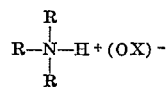

wherein X represents a $C_2$ to $C_{20}$ aliphatic acyl group, and R designates hydrogen or the same or different branched or straight chain alkyl groups of 1 to 10, preferably 1 to 4, carbon atoms, e.g.:

Trimethylammonium stearate
Ammonium laurate
N-ethyl-N-methylpropylammonium caprate
Tripropylammonium acetate
Trimethylammonium butyrate
Trioctylammonium palmitate
Ammonium and substituted ammonium salts of coconut oil, palm oil, olive oil, etc., fatty acids (5) Amides of the formula $R_2N-X$, wherein X represents a $C_1$ to $C_{10}$, preferably $C_2$ to $C_5$, aliphatic acyl group, and R represents either hydrogen or the same or different alkyl groups of 1 to 4 carbon atoms, e.g.:

Dimethylformamide
N-methylacetamide
n-Butyramide
Dimethyl acetamide
Dibutyl hexaneamide J. Heterocyclic nitrogen compounds of 4–12 carbon atoms and 1–3 nitrogen atoms, including specifically:

Pyridine
Quinoline
Isoquinoline
Methyl pyridines
Lutidines
Collidines
Quinaldine
Indole
Piperidine In addition to the foregoing preferred classes of additives, the following are also contemplated as non-limiting examples.

I. Halogen compounds:

Methyl chloride
Ethyl chloride
Ethyl bromide
Amyl chlorides
Iodoform
Pentachloroethane
Vinyl chloride
Dichloroethylene
Trichloroethylene
Chloroprene
Dichlorodifluoromethane
Chlorobenzene
o-Dichlorobenzene
p-Chlorotoluene
Benzyl chloride
Chloronaphthalenes
Chlorocyclohexane II. Alcohols and phenols:

tert-Butanol
Pentanols
Methylisobutyl carbinol
Capryryl alcohol
Lauryl alcohol
Allyl alcohol
Oleyl alcohol
Linalool
Citronellol
Ethylene glycol
Propylene glycol
Butane-1:3-diol
Butane-1:4-diol
Hexylene glycol
Glycerol
Trimethylolethane
Trimethylolpropane
Benzyl alcohol
Phenylethyl alcohol
Phenol
o-Chlorophenol
p-Cresol
beta-Naphthol
p-Octyl phenol III. Ethers:

Diethyl ether
Di-isopropyl ether
Di-N-butyl ether
Dichlorodiethyl ether
Divinyl ether
Ethylene oxide
Diethylene glycol
Triethylene glycol
Ethylene glycol monomethyl ether
Propylene oxide
Epichlorohydrin
Anisole
p-Phenetidine
Phenacetin
Benzyl ethyl ether IV. Aldehydes:

Glyoxal
Acrolein
Crotonaldehyde
Citronellal
Citral
p-Chlorobenzaldehyde
Salicylaldehyde
Anisaldehyde
Phenylacetaldehyde V. Ketones:

Diacetonealcohol
Methyl vinyl ketone
Mesityl oxide
Cyclopentanone
Acetophenone
p-Methylacetophenone
p-Methoxyacetophenone
Propiophenone
Benzylideneacetone VI. Carboxylic acids:

Formic acid
Chloroacetic acid
Propionic acid
Succinic acid
Adipic acid
Sebacic acid
Acrylic acid
Fumaric acid
Itaconic acid
Glycolic acid
Thioglycolic acid
Lactic acid
Malic acid
Gluconic acid
Benzoic acid
Phenylacetic acid
Salicyclic acid
Phthalic acid
Anthranilic acid VII. Derivatives of carboxylic acids—
A. Acyl halides of any of the foregoing acids, e.g.:

Acetyl chloride
Lauroyl chloride
Benzoyl chloride

B. Esters of any of the foregoing acids, e.g.:

Ethyl acetate
Isopropyl acetate
Methyl salicylate
Diethyl phthalate
Phenylethyl acetate
Benzyl acetate C. Salts of any of the foregoing acids, e.g.:

Calcium stearate
Magnesium oleate
Sodium oleate
Zinc stearate
Zinc naphthenate
Manganous butyrate
Chromium laurate
Nickel palmitate
Sodium benzoate
Sodium salicylate
Sodium succinate
Potassium lactate
Calcium acetate
Magnesium laurate
Ferrous acetate
Cobalt naphthenate D. Amides of any of the foregoing or other acids, e.g.:

Acetamide
Isobutyramide
Benzamide
Acetanilide
Urea
N-methylolurea
Tetramethyl urea
N-methylpyrrolidone E. Nitriles of any of the foregoing acids, e.g.:

Acetonitrile
Propionitrile
n-Butyronitrile
Lauronitrile
Acrylonitrile
Benzonitrile F. Anhydrides of any of the foregoing acids, e.g.:

Acetic anhydride
Propionic anhydride
Aceto-butyric anhydride
Maleic anhydride
Phthalic anhydride VIII. Nitro compounds, nitrates and nitrites:

Methyl nitrate
Amyl nitrite
Nitromethane
Nitroethane
2-nitrobutane-1-ol
Nitrobenzene
p-Nitrotoluene
m-Chloronitrobenzene
p-Nitroanisole IX. Sulfur compounds:

Dimethyl sulfoxide
Ethyl mercaptan
n-Butyl mercaptan
Dodecyl mercaptan
Sodium diethyl dithiocarbamate
Potassium ethyl xanthate
Benzene sulfonic acid
Toluene sulfonic acid
Sodium naphthalene sulfonates
Metanilic acid
Thiophenol
Thiourea
Diethyl sulfate
Dimethyl sulfone
Isopropyl n-butyl sulfone
Methyl phenyl sulfone X. Amino compounds:

Ethylamine
Isopropylamine
n-Butylamine
n-Dodecylamine
Ethylene diamine
Hexamethylene diamine
Monoethanolamine
Diethanolamine
Aniline
p-Toluidine
m-Chloroaniline
p-Nitroaniline
Diphenylguanidine
Phenylhydrazine
m-Phenylenediamine
Benzidine
Diethylamine
Triethylamine
Diethylene triamine
Triethylene tetramine
N-dodecyl ethylenediamine
N-oleyl ethylenediamine
N-oleyl monoethanolamine
Ethylenediamine tetra-acetic acid
n-Butyl phenylamine
o-Toluidine
m-Toluidine
Benzylamine
N-methyl benzylamine
Alpha phenylethylamine
Beta phenylethylamine XI. Phosphorus compounds:

Triethyl phosphate
Tri-n-butyl phosphate
Tri-n-butyl phosphine
Dioctyl hydrogen phosphite
Dibutyl hydrogen phosphite XII. Heterocyclic compounds:

Furfuryl alcohol
Acridine
Carbazole
Diphenylene oxide
Alkyl piperidines
Alkylimidazolines
Alkylpyrimidines
Imidazoles
Benzimidazoles
Oxazoles
1-phenyl-3-methyl-5-pyrazolone
Thiazole
Thiophene
Methyl thiophene
Thiophane XIII. Silicon compounds:

Trimethylchlorosilane
Triphenylchlorosilane
Hexamethyldisiloxane
Trimethyl silanol
Diethylsilanediol
Ethyl silicate
Tetraethylsilicane XIV. Boron compounds:

Ethylboric acid
Amylboric acid
Diphenylboric acid
Trimethylborine
Tri-n-butylborine
Triethyl borate The following examples are cited to illustrate operative details of the process, but are not to be construed as limiting in scope. In all cases, the analyses were by gas chromatography:

Example I.—Methylal

13/87 mixture of p-xylene and m-xylene to which had been added 0.4 weight percent of methylal was cooled with stirring until crystals of p-xylene started separating. At −104° F. the crystals were separated by filtration through a chilled Buchner funnel. The crystal fraction contained 29.5% m-xylene and 70.5% p-xylene which represented 61% of the p-xylene from the charge. The liquid fraction contained 95.3% m-xylene and 4.6% p-xylene.

Example II.—Acetal

A 30/70 mixture of p-xylene and m-xylene to which has been added acetal is cooled with stirring to about −105° F. The resulting slurry is filtered through a chilled Buchner funnel. The crystalline fraction separated contains more than 65% of the charge p-xylene. The two fractions are then refined by water washing which removen the acetal.

Example III.—Methyl isobutyl ketone

A eutectic mixture of para-/meta-xylene was prepared by mixing 13% by weight (3.9 grams) of para-xylene with 87% by weight (26.1 grams) of meta-xylene. To this mixture (at room temperature) was added 0.4% by weight (0.12 gram) of technical grade methyl isobutyl ketone. The mixture was chilled, with stirring, to −104° F. Crystals (which first appeared at −89° F.) were separated by filtration through a chilled Buchner funnel. The crystal fraction contained 16.9% meta-xylene and 83.1% para-xylene (which represented 48% of the charge para-xylene). The liquid fraction contained 92.9% meta-xylene and 6.9% para-xylene.

Example IV.—Acetone

To a mixture of xylenes containing 13% para-xylene and 87% meta-xylene was added 0.4% by weight of acetone. The resulting mixture was chilled with stirring to −100° F. A slurry resulted and a solid fraction was separated by filtration. This fraction contained 24.5% meta-xylene and 75.5% para-xylene.

Example V.—Acetone

To a mixture of xylenes containing 13% para-xylene and 87% meta-xylene was added 0.4% by weight of acetone. The resulting mixture was chilled with stirring to −102° F. A slurry resulted and a solid fraction was separated by filtration. This fraction contained 32% meta-xylene and 68% para-xylene.

Example VI.—N-methyl morpholine

A 13/87 mixture of para-xylene and meta-xylene to which had been added 0.4% by weight of N-methyl-morpholine was cooled, with stirring, until crystals of para-xylene started forming. At −104° F. the crystals were separated by filtration through a chilled Buchner funnel. The crystal fraction contained 42.0% meta-xylene and 58.0% para-xylene which represented 61.0% of the para-xylene from the charge. The liquid fraction contained 95.4% meta-xylene and 4.5% para-xylene.

Example VII.—Morpholine

A 30/70 mixture of para-xylene and meta-xylene to which had been added 0.2% by weight of morpholine was cooled, with stirring, to about −105° F. The resulting slurry was filtered through a chilled Buchner funnel. The crystalline fraction separated contained more than 65% of the charge para-xylene. The two fractions were then refined by water-washing which removed the morpholine.

Example VIII.—Coconut oil fatty acids

To a 13/87 mixture of para- and meta-xylenes was added 0.005 weight-percent (0.02 gram) of coconut oil fatty acids. When this mixture was chilled with stirring to −104° F., it was possible to separate two fractions by filtration through a chilled Buchner funnel. The crystal fraction contained 71.8% para-xylene and 28.8% meta-xylene, the para-xylene component representing 50.5% of the charged para-xylene. The liquid fraction contained 6.6% para-xylene and 93.2% meta-xylene.

Example IX.—Coconut oil fatty acids

A 13/87 eutectic mixture of para-xylene and meta-xylene was prepared. To this was added 0.01% of fatty acids from coconut oil, and the resulting mixture was chilled, with stirring, to −104° F. There resulted a slurry from which it was possible to separate two fractions by filtration through a chilled Buchner funnel: a crystal fraction composed of 66.0% para-xylene and 34.0% meta-xylene, the para-xylene component representing 44.8% of the charged para-xylene; and a liquid fraction composed of 7.2% para-xylene and 92.6% meta-xylene.

Example X.—Palm oil fatty acids

A mixture of xylenes containing 30% para-xylene and 70% meta-xylene is chilled, with stirring, to −75° F. A slurry of crystals results and the product is separated into two fractions by filtration through a chilled Buchner funnel. Approximately 65% of the para-xylene is recovered in the crystal fraction. To the liquid fraction, containing approximately 13% para-xylene, is added 0.002 weight-percent of palm oil fatty acids and the resulting mixture is chilled with stirring to −105° F. A slurry results and about 50% of the para-xylene is recovered from the crystal fraction separated by filtration. This fraction and the other fraction, which is rich in meta-xylene, may be refined of trace amounts of fatty acid by caustic washing.

Example XI.—Stearic acid

To a mixture of xylenes containing 30% para-xylene and 70% meta-xylene is added 0.02 weight-percent stearic acid. The resulting mixture is chilled with stirring to −104° F. A slurry results and a solid fraction, containing more than 65% of the charged para-xylene, is separated by filtration. The para-xylene is refined of trace amounts of stearic acid by distillation.

Example XII.—Butyl acetate

A 13/87 mixture of para-xylene and meta-xylene to which had been added 0.4 weight-percent of butyl acetate was cooled with stirring until crystals of para-xylene appeared. At −104° F. the crystals were separated by filtration through a chilled Buchner funnel. The crystal fraction contained 25.8% meta-xylene and 74.2% para-xylene which represented 48.0% of the charged para-xylene. The liquid fraction contained 92.8% meta-xylene and 6.9% para-xylene.

Example XIII.—Methyl n-butyrate

A 30/70 mixture of para-xylene and meta-xylene to which had been added 0.02 weight-percent methyl n-butyrate is cooled with stirring to about −105° F. The resulting slurry is filtered through a chilled Buchnel funnel. The crystalline fraction separated contains more than 65% of the charged para-xylene. The two fractions are then refined by distilling off methyl butyrate.

Example XIV.—Sodium stearate

A 13/87 mixture of para-xylene and meta-xylene was washed with a water-soap solution containing 0.1 weight-percent of sodium stearate. After 10 minutes of mild agitation, the soap-water phase was discarded and the treated mixture of para-xylene and meta-xylene was cooled, with stirring, until crystals of para-xylene appeared. At −104° F. the crystals were separated by filtration through a chilled Buchner funnel. The crystal fraction contained 28.8% meta-xylene and 71.2% para-xylene which represented 56.0% of the para-xylene in the charge. The liquid fraction contained 94.9% meta-xylene and 5.0% para-xylene.

Example XV.—Ammonium laurate

A 30/70 mixture of para-xylene and meta-xylene to which has been added 0.02 weight-percent ammonium laurate is cooled, with stirring, to about −105° F. The resulting slurry is filtered through a chilled Buchner funnel. The crystalline fraction separated contains more than 65% of the para-xylene in the charge. The two fractions are then refined by water-washing which removes the ammonium laurate.

Example XVI.—Dimethylformamide

A 13/87 mixture of para-xylene and meta-xylene to which had been added 0.4 weight-percent of dimethylformamide was cooled, with stirring, until crystals of para-xylene started forming. At −104° F. the crystals were separated by filtration through a chilled Buchner funnel. The crystal fraction contained 33.9% meta-xylene and 66.1% para-xylene which represented 62.2% of the para-xylene in the charge. The liquid fraction contained 95.7% meta-xylene and 4.3% para-xylene.

Example XVII.—n-Butyramide

A 30/70 mixture of para-xylene and meta-xylene to which has been added 0.2 weight-percent n-butyramide is cooled, with stirring, to about −105° F. The resulting slurry is filtered through a chilled Buchner funnel. The crystalline fraction separated contains more than 65% of the charged para-xylene. The two fractions are then refined by water-washing which removes the n-butyramide.

Example XVIII.—Carbon tetrachloride

A 13/87 mixture of para-xylene and meta-xylene to which had been added 0.4 weight-percent of carbon tetrachloride was cooled, with stirring, until crystals of para-xylene started forming. At −100° F. the crystals were separated by filtration through a chilled Buchner funnel. The crystal fraction contained 34.4% meta-xylene and 65.6% para-xylene which represented 42.4% of the para-xylene in the charge. The liquid fraction contained 91.8% meta-xylene and 7.9% para-xylene.

Example XIX.—Chloroform

A 13/85 mixture of para-xylene and meta-xylene to which had been added 0.8 volume-percent of chloroform was cooled, with stirring, until crystals of para-xylene started forming. At −100° F. the crystals were separated by filtration. The crystal fraction contained 46% meta-xylene and 53.5% para-xylene which represented 53% of the para-xylene in the charge. The liquid fraction contained 92.5% meta-xylene and 7.1% para-xylene.

Example XX.—Dioxane

A 13/85 mixture of para-xylene and meta-xylene to which had been added 0.4 volume-percent of 1,4-dioxane was cooled, with stirring, until crystals of para-xylene started forming. At −100° F. the crystals were separated by filtration. The crystal fraction contained 48% meta-xylene and 51.1% para-xylene which represented 52% of the para-xylene in the charge. The liquid fraction contained 7.1% para-xylene.

Example XXI.—Acetic acid

A 13/85 mixture of para-xylene and meta-xylene to which had been added 0.4 volume-percent of acetic acid was cooled, with stirring, until crystals of para-xylene started forming. At −100° F. the crystals were separated by filtration. The crystal fraction contained 48% meta-xylene and 51.6% para-xylene which represented 54% of the para-xylene in the charge. The liquid fraction contained 7.0% para-xylene.

Example XXII.—Benzaldehyde

A 13/85 mixture of para-xylene and meta-xylene to which had been added 0.8 volume-percent of benzaldehyde was cooled, with stirring, until crystals of para-xylene started forming. At −100° F. the crystals were separated by filtration. The crystal fraction contained 39.5% meta-xylene and 60.1% para-xylene which represented 56% of the para-xylene in the charge. The liquid fraction contained 6.6% para-xylene.

Example XXIII.—Methanol

A 13/85 mixture of para-xylene and meta-xylene to which had been added 0.4 volume-percent of methanol was cooled, with stirring, until crystals of para-xylene started forming. At −100° F. the crystals were separated by filtration. The crystal fraction contained 65% meta-xylene and 34.7% para-xylene which represented 55% of the para-xylene in the charge. The liquid fraction contained 7.4% para-xylene.

Example XXIV.—N-Methyl pyrrolidone

A 13/87 mixture of para-xylene and meta-xylene to which had been added 0.6 weight-percent of N-methyl pyrrolidone was cooled, with stirring, until crystals of para-xylene started forming. At −104° F. the crystals were separated by filtration through a chilled Buchner funnel. The crystal fraction contained 43.7% meta-xylene and 56.2% para-xylene which represented 42.1% of the para-xylene in the charge. The liquid fraction contained 91.4% meta-xylene and 8.6% para-xylene.

Example XXV.—Tert butyl alcohol

A 13/85 mixture of para-xylene and meta-xylene to which had been added 0.4 volume-percent of tert butyl alcohol was cooled, with stirring, until crystals of para-xylene formed. The resulting mixture was held at −100° F. for 2 hours with occasional stirring. At the end of the 2-hour period, the mixture remained fluid, still containing crystals of p-xylene in the supercooled mother liquor, thus indicating sufficient stability of the system to permit separation of p-xylene in a commercial freezing unit. In contrast, when the same experiment was repeated without the inhibitor, the entire mixture froze solid substantially immediately upon reaching −100° F.

Example XXVI.—n-Butyl alcohol

Example XXV was repeated using n-butyl alcohol as the inhibitor. The same results were observed.

Example XXVII.—Dimethyl sulfoxide

Example XXV was repeated using dimethyl sulfoxide as the inhibitor. The same results were observed.

Example XXVIII.—Methylene chloride

Example XXV was repeated using 0.7 volume-percent of methylene chloride as the inhibitor. The same results were observed.

Example XXIX.—Pyridine

Example XXV was repeated using pyridine as the inhibitor. The same results were observed.

Example XXX

To further test the stability of supercooled xylene mixtures, several samples of a 13/85 mixture of meta- and para-xylenes, containing 0.4 volume-percent of various inhibitors, were allowed to stand at −100° F. for extended periods with occasional shaking. After 72 hours, the mixtures containing methanol, dioxane, butyl acetate, morpholine, or dimethylformamide remained fluid with crystals of p-xylene present. Without on inhibitor, the mixture froze solid in less than 2 hours.

Example XXXI

This example shows that some hydrocarbons can also act as eutectic inhibitors, but only in large, diluent proportions. The xylene mixture used in Example XXX was mixed with various proportions of ethylbenzene and held at −100° F., with the following results:

| Percent ethylbenzene added: | Time at −100° F. for total freeze-up, hours |
|---|---|
| 1 | 0 |
| 3 | 0 |
| 5 | 2 |
| 10 | >5 |

The foregoing detailed description is not to be construed as limiting in scope. The true scope of the invention is intended to be defined by the following claims.

We claim:

1. A method for separating p-xylene in purified form from a feed comprising mixed para-xylene and meta-xylene, which comprises adding to said feed a minor proportion, less than about 3 mole-percent, of a eutectic inhibitor selected from the class consisting of organic compounds which (1) contain at least one hetero-atom of oxygen, sulfur, nitrogen, phosphorus, silicon, boron or halogen, and (2) are at least slightly soluble in xylenes, thereafter cooling the mixture thus produced to a temperature below about −80° F. and substantially below the meta-para eutectic temperature of the feed, and separating crystallized para-xylene from the remaining metastable mother liquor, said mother liquor containing para-xylene in a concentration less than the meta-para eutectic proportions.

2. A method as defined in claim 1 wherein said eutectic inhibitor is employed in proportions between about 0.01 and 2 mole-percent.

3. A method as defined in claim 1 wherein said eutectic inhibitor is a saturated aliphatic ketone having 3 to 20 carbon atoms.

4. A method as defined in claim 1 wherein said eutectic inhibitor is acetone.

5. A method as defined in claim 1 wherein said eutectic inhibitor is methyl isobutyl ketone.

6. A method as defined in claim 1 wherein said eutectic inhibitor is morpholine or a lower alkyl substitued morpholine.

7. A method as defined in claim 1 wherein said eutectic inhibitor is morpholine.

8. A method as defined in claim 1 wherein said eutectic inhibitor is N-methyl morpholine.

9. A method as defined in claim 1 wherein said eutectic inhibitor is selected from the group consisting of $C_1$ to $C_4$ dialkoxy gem-substituted aliphatic hydrocarbons of 1 to 8 carbon atoms.

10. A method as defined in claim 1 wherein said eutectic inhibitor is dimethoxy methane.

11. A method as defined in claim 1 wherein said eutectic inhibitor is 1,1-diethoxy ethane.

12. A method as defined in claim 1 wherein said eutectic inhibitor is selected from the group consisting of $C_1$ to $C_{20}$ aliphatic acids and aliphatic esters, alkali metal salts, alkyl substituted and unsubstituted ammonium salts, and alkyl substituted and unsubstituted amides thereof.

13. A method as defined in claim 1 wherein said eutectic inhibitor is an ester of a $C_2$ to $C_8$ aliphatic carboxylic acid and a $C_1$ to $C_{12}$ aliphatic alcohol.

14. A method as defined in claim 1 wherein said eutectic inhibitor is butyl acetate.

15. A method as defined in claim 1 wherein said eutectic inhibitor is an alkali metal salt of an aliphatic carboxylic acid having 2 to 20 carbon atoms.

16. A method as defined in claim 1 wherein said eutectic inhibitor is sodium stearate.

17. A method as defined in claim 1 wherein said eutectic inhibitor is an ammonium salt of the formula:

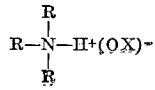

wherein X is a $C_2$ to $C_{20}$ aliphatic acyl group and each R is hydrogen or a $C_1$ to $C_4$ alkyl group.

18. A method as defined in claim 1 wherein said eutectic inhibitor is ammonium laurate.

19. A method as defined in claim 1 wherein said eutectic inhibitor is an amide of the formula: $R_2N$—X, in which X is a $C_2$ to $C_5$ aliphatic acyl group and each R is hydrogen or a $C_1$ to $C_4$ alkyl group.

20. A method as defined in claim 1 wherein said eutectic inhibitor is dimethylformamide.

21. A method as defined in claim 1 wherein said eutectic inhibitor is n-butyramide.

22. A method as defined in claim 1 wherein said eutectic inhibitor is acetic acid.

23. A method as defined in claim 1 wherein said eutectic inhibitor is a lower aliphatic alcohol of 1 to 12 carbon atoms.

24. A method as defined in claim 1 wherein said eutectic inhibitor is methanol.

25. A method as defined in claim 1 wherein said eutectic inhibitor is an aldehyde of 1 to 12 carbon atoms.

26. A method as defined in claim 1 wherein said eutectic inhibitor is benzaldehyde.

27. A method as defined in claim 1 wherein said eutectc inhibitor is a chlorohydrocarbon of 1 to 12 carbon atoms.

28. A method as defined in claim 1 wherein said eutectic inhibitor is chloroform.

29. A method as defined in claim 1 wherein said eutectic inhibitor is carbon tetrachloride.

30. A method as defined in claim 1 wherein said eutectic inhibitor is a cyclic ether of 3 to 12 carbon atoms.

31. A method as defined in claim 1 wherein said eutectic inhibitor is 1,4 dioxane.

32. A method as defined in claim 1 wherein said eutectic inhibitor is a heterocyclic nitrogen compound of 4 to 12 carbon atoms.

33. A method as defined in claim 1 wherein said eutectic inhibitor is pyridine.

34. A method as defined in claim 1 wherein said crystallization of p-xylene is carried out at a temperature between about −80° and −105° F.

35. A method as defined in claim 1 wherein said crystallization of p-xylene is carried out in the presence of trace amounts of water.

36. A method as defined in claim 1 wherein said feed is essentially meta- and para-xylene in substantially the eutectic proportions.

37. A method as defined in claim 1 wherein said eutectic inhibitor is water-soluble.

38. A method for resolving a substantially eutectic mixture of meta- and para-xylenes, which comprises:
 (1) subjecting said mixture to fractional crystallization at a temperature below about −80° F. in admixture with a small amount, not more than about 3 mole-percent, of a eutectic inhibitor selected from the class consisting of organic compounds which (a) contain at least one hetero-atom of oxygen, sulfur, nitrogen, phosphorus, silicon, boron or halogen, and (b) are at least slightly soluble in xylenes;
 (2) separating purified crystalline p-xylene from the remaining metastable mother liquor;
 (3) treating said mother liquor to remove said eutectic inhibitor;
 (4) subjecting the treated mother liquor to a second fractional crystallization to produce a purified crystalline meta-xylene and a second mother liquor containing substantially the eutectic proportion of para- and meta-xylene.

39. A method as defined in claim 38 wherein said crystallization of p-xylene is carried out at a temperature between about −80° and −105° F.

40. A method as defined in claim 38 wherein said crystallization of p-xylene is carried out in the presence of trace amounts of water.

41. A method as defined in claim 38 wherein said eutectic inhibitor is a water-soluble compound, and said treating step (3) is water washing.

42. A method as defined in claim 41 wherein said eutectic inhibitor is employed in proportions between about 0.01 and 2 mole-percent.

43. A method as defined in claim 41 wherein said eutectic inhibitor is a saturated aliphatic ketone having 3 to 20 carbon atoms.

44. A method as defined in claim 41 wherein said eutectic inhibitor is morpholine or a lower alkyl substituted morpholine.

45. A method as defined in claim 41 wherein said eutectic inhibitor is selected from the group consisting of $C_1$ to $C_4$ dialkoxy gem-substituted aliphatic hydrocarbons of 1 to 8 carbon atoms.

46. A method as defined in claim 41 wherein said eutectic inhibitor is an alkali metal salt of an aliphatic carboxylic acid having 2 to 20 carbon atoms.

47. A method as defined in claim 41 wherein said eutectic inhibitor is an ammonium salt of the formula:

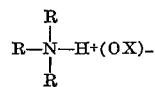

wherein X is a $C_2$ to $C_{20}$ aliphatic acyl group and each R is hydrogen or a $C_1$ to $C_4$ alkyl group.

48. A method as defined in claim 41 wherein said eutectic inhibitor is an amide of the formula: $R_2N-X$, in which X is a $C_2$ to $C_5$ aliphatic acyl group and each R is hydrogen or a $C_1$ to $C_4$ alkyl group.

49. A method as defined in claim 41 wherein said eutectic inhibitor is a lower aliphatic alcohol of 1 to 12 carbon atoms.

50. A method as defined in claim 41 wherein said eutectic inhibitor is an aldehyde of 1 to 12 carbon atoms.

51. A method as defined in claim 41 wherein said eutectic inhibitor is a cyclic ether of 3 to 12 carbon atoms.

52. A method as defined in claim 41 wherein said eutectic inhibitor is a heterocyclic nitrogen compound of 4 to 12 carbon atoms.

References Cited

UNITED STATES PATENTS 2,530,978  11/1950  Mason _____ 260—674
2,622,115  12/1952  Carney _____ 260—674

DELBERT E. GANTZ, *Primary Examiner.*

C. E. SPRESSER, *Assistant Examiner.*